T. ROACH.
MILK-COOLER.

No. 179,958. Patented July 18, 1876.

Witnesses:
Jas. F. Duhamel,
H. B. Brown

Inventor:
Thomas Roach
per
H. J. Abbot.
Attorney.

UNITED STATES PATENT OFFICE.

THOMAS ROACH, OF HENVELTON, NEW YORK, ASSIGNOR OF ONE-HALF HIS RIGHT TO GEORGE T. SMITH, OF SAME PLACE.

IMPROVEMENT IN MILK-COOLERS.

Specification forming part of Letters Patent No. 179,958, dated July 18, 1876; application filed April 15, 1876.

*To all whom it may concern:*

Be it known that I, THOMAS ROACH, of Henvelton, in the county of St. Lawrence and State of New York, have invented certain new and useful Improvements in Milk-Coolers, of which the following is a specification:

The nature of my invention consists in the construction and arrangement of a milk-cooler, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
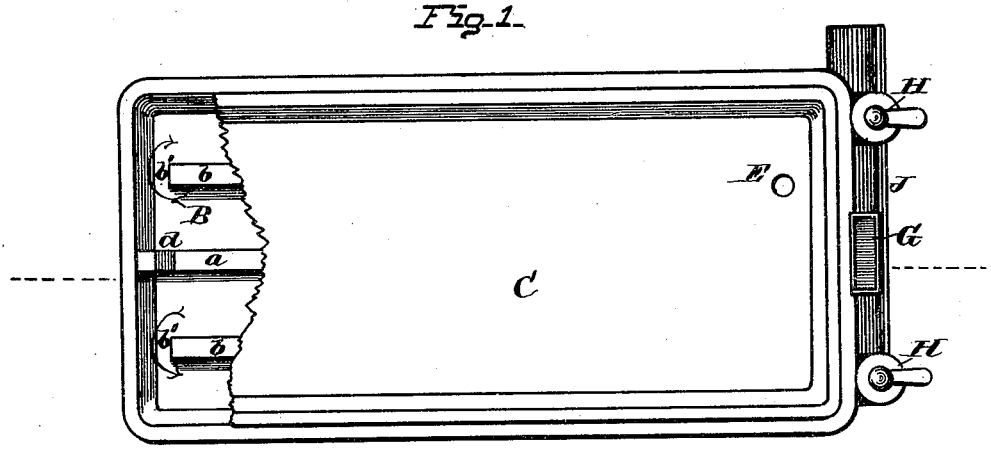
Figure 2:
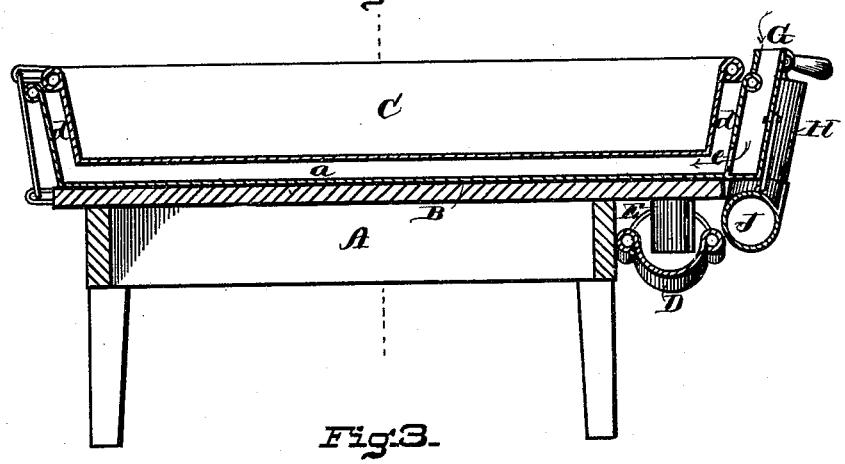
Figure 3:
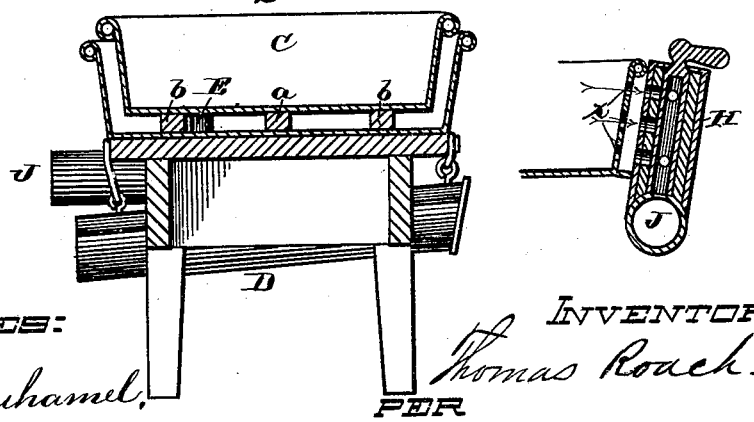

Figure 1 is a plan view of my invention. Fig. 2 is a longitudinal vertical section, and Fig. 3 a transverse vertical section, of the same.

A represents a suitable table or bench, upon which the vat B is supported. In this vat is one central longitudinal rib or partition, $a$, extending up both ends of the vat, and on each side thereof is another longitudinal rib or partition, $b$, extending up one of the ends of the vat, and leaving a passage, $b'$, between the other end and the end of the partition. The upward-projecting ends of the ribs or partitions $a$ and $b$ are provided with suitable packing $d$, to hold the milk-pan C tightly and firmly when placed in the vat, said pan being provided with an outlet-pipe, E, passing through the bottom of the vat, and emptying the milk into a trough or conductor, D, suspended under the table A, and from which it is then carried off to any place where desired. At the end of the vat B is an inlet-spout, G, into which water is conducted, and from which it passes through openings $e\ e$ into the vat. These openings are located, one on each side of the partition $a$, so as to divide the water into two currents, each of which passes between said center partition $a$ and the side partition $b$ to the opposite end of the vat, where it goes through the passage $b'$ to the other side of said partition, and returns to the same end of the vat at which it entered, and then passes out through one of a series of holes, $x$, leading into a tube or barrel, H, having a faucet-plug, I, placed therein. The faucet-plugs I are provided with a series of holes alternately on opposite sides, one above the other, so that the water can be easily regulated by adjusting the plug. To the lower ends of the barrel or tubes H is connected a trough or conductor, J, for carrying off the water to any point desired.

By this construction of the milk-cooler, and by circulating the water in two separate streams from the center outward, the milk is cooled more evenly and uniformly throughout.

Having thus fully described my invention, what I claim as new, and desire to secure by Letters Patent, is—

1. The vat B, provided with partition $a$, extending up both ends of the vat, and side partitions $b\ b$, extending up one of the ends of the vat, and leaving a passage, $b'\ b'$, between the other end of the vat and the end of the partition, and two water-inlets, $e\ e$, one on each side of the central partition, and outlets $x\ x$, substantially in the manner and for the purposes herein set forth.

2. In combination with the vat B, having a partition, $a$, extending up both ends of the vat, and side partitions $b\ b$, extending up one of the ends of the vat, and leaving a passage, $b'\ b'$, between the other end of the vat and the end of the partition, and two series of outlet-openings, $x\ x$, barrels or chambers H H, and plugs I I, substantially in the manner and for the purposes herein set forth.

In testimony that I claim the foregoing as my own I affix my signature in presence of two witnesses.

THOMAS ROACH.

Witnesses:
 JAMES E. CHAFFEE,
 MOSES HUTCHINSON.